May 4, 1965   J. C. ELDER   3,182,242
MOTOR STARTER
Filed Jan. 30, 1962   2 Sheets-Sheet 2

INVENTOR:
JAMES C. ELDER,
BY Irving H. Marshman
ATTORNEY.

United States Patent Office
3,182,242
Patented May 4, 1965

3,182,242
MOTOR STARTER
James C. Elder, Berkeley, Calif., assignor to General Electric Company, a corporation of New York
Filed Jan. 30, 1962, Ser. No. 169,740
4 Claims. (Cl. 318—230)

This invention relates to motor starters, more particularly to starters for alternating current motors and it has for an object the provision of a simple, reliable, inexpensive and efficient starter of this character.

Still more specifically, the invention relates to starters for 3-phase delta wound alternating current motors in which the motor windings are connected by means of switching devices through a reduced voltage device to three-phase alternating voltage supply conductors and are subsequently connected directly to the supply conductors, and a more specific object of the invention is to effect a substantial increase in the current rating of a starter of this character without requiring the use of switching devices of increased rating.

Still more specifically, the invention relates to starters for alternating current motors in which the motor phase windings are connected to power lines in delta and a more specific object of the invention is the provision of a starter of this character in which the contacts of the switching devices employed to complete the starting and running connections are in series with the motor phase windings within the delta circuit configuration both during the entire starting transition and thereafter during the normal running operation.

A further object of the invention is the provision of a motor starter of the above character in which, during the starting period, the motor windings are connected in delta to the supply conductors through an auto transformer reduced voltage starting device.

In carrying the invention into effect in one form thereof, all six winding terminals of the terminally separated windings of a six terminal delta wound motor are separately brought out for external connection so that each of the three motor phase windings has first and second external terminals. A three-phase auto transformer is provided with intermediate reduced voltage taps and means are provided for connecting the first terminal of each of the motor phase windings to a tap on a corresponding phase winding of the auto transformer together with a starting switching device for connecting the auto transformer phases to corresponding supply conductors. A first switching device is provided with contacts for completing connections from the second terminal of each motor phase winding to a corresponding supply conductor and a second switching device is provided with contacts for completing connections from the first terminal of each motor phase winding to a corresponding supply conductor. All connections from motor winding phase terminals to corresponding supply conductors are completely isolated from each other throughout their extent from the switching device contacts to the motor phase terminals so that at all times when switching devices are closed to connect the motor to the supply conductors, the switching device contacts are in series with the motor phase windings within the delta configuration and thus never carry current in excess of motor phase current.

For a better and more complete understanding of the invention reference should now be had to the following specification and to the accompanying drawings of which:

Figure 1:
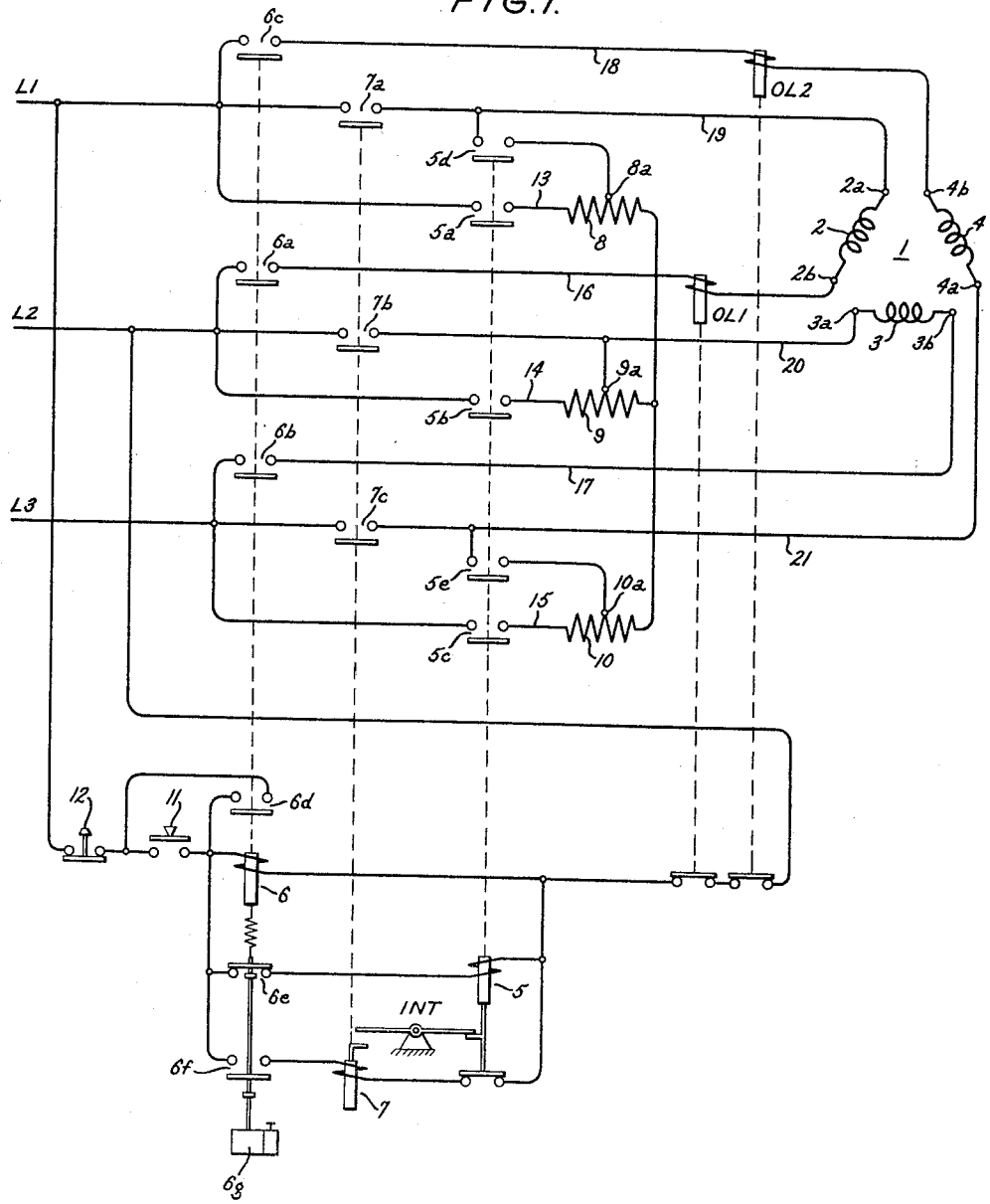
FIG. 1 is a simple schematic diagram of an embodiment of the invention.

Referring now to the drawings and particularly to FIG. 1, an alternating current induction motor 1 is provided with three terminally separated primary phase windings 2, 3 and 4 with all six terminals 2a, 2b, 3a, 3b, 4a and 4b separately brought out for external connection. Appropriate switching devices such as electromagnetic contactors 5, 6 and 7 are provided for connecting the motor phase windings 2, 3 and 4 to 3-phase power supply conductors L1, L2 and L3. For the purpose of reducing the voltage supplied to the motor during starting an auto transformer comprising three phase windings 8, 9 and 10 is provided. In the modification of FIG. 1, the three transformer windings 8, 9 and 10 are permanently Y connected and the three-phase terminals of these windings are arranged to be connected to supply conductors L1, L2 and L3 by means of the starting contactor 5. In this connection, the starting contactor 5 is provided with contacts 5a, 5b and 5c for connecting the terminals of the transformer phase windings to the corresponding supply conductors L1, L2, and L3 respectively. The transformer phase windings 8, 9 and 10 are further provided with reduced voltage taps 8a, 9a and 10a respectively and means are provided for connecting the first terminals 2a, 3a and 4a of each of the three motor phase windings to the corresponding reduced voltage taps 8a, 9a and 10a of the auto transformer windings. These means comprise a permanent connection from first motor phase terminal 3a to reduced voltage tap 9a and additional main contacts 5d and 5e on starting contactor 5 for connecting the first terminals 2a and 4a of motor phase windings 2 and 4 to reduced voltage taps 8a and 10a respectively of the corresponding transformer phase windings 8 and 10 respectively. The reduced voltage starting connections of the motor to the supply lines L1, L2 and L3 are completed by means of contactor 6. Final full voltage running connections of the motor to the supply lines are completed by the contactor 7. For initiating the starting and stopping operations of the motor, suitable control means are provided. This means is illustrated as a start and stop manually operated push-button accessory that comprises a start push-button switch 11 and a stop push-button switch 12. Overload protection is provided by suitable means illustrated as overload relays OL1 and OL2 having their coils connected in series relationship with motor phase windings 2 and 4 and their contacts in series relationship in the supply connection to the operating coils of contactors 5, 6 and 7. These overload relays OL1 and OL2, which are illustrated conventionally may be of any suitable type. For example, they may be of the thermal type. Suitable mechanical interlocking means designated INT on FIG. 1 prevent simultaneous closure of contactors 5 and 7.

Figure 3:
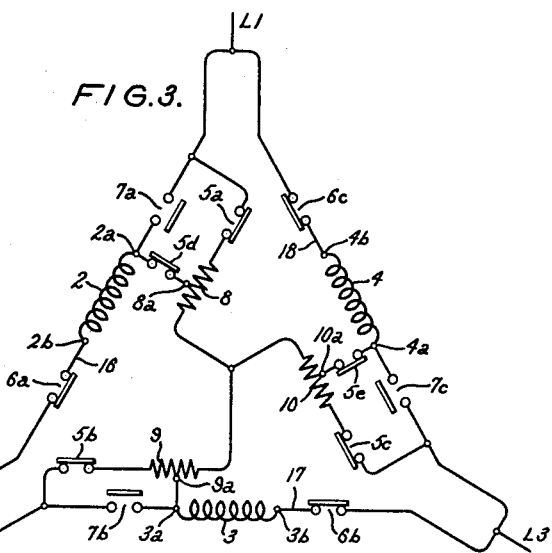
FIGS. 3 and 4 are diagrammatic sketches of the main or power circuit connections for the acceleration and running positions respectively of the modification of FIG. 1.

With the foregoing understanding of the elements and their organization, the operation of the starter will readily be understood from the following description: In FIG. 1 the parts are illustrated in their normally deenergized condition with the motor 1 at rest. The starting operation is initiated by depressing the push-button switch 11 to close its normally open contacts thereby to complete energizing circuits for the operating coils of contactors 5 and 6. The operating coil of contactor 5 is energized through contacts 6e which are delayed in opening as will presently appear. In response to energization, contactors 5 and 6 pick up and contactor 6 seals in both itself and contactor 5 through auxiliary contacts 6d. Start push-button switch may then be released. In its picked up position contactor 5 closes its main contacts 5a, 5b and 5c to complete connections from the first terminals 2a and 4a of motor phase windings 2 and 4 to the reduced voltage taps 8a and 10a respectively of the transformer phase windings 8 and 10. The connection from first terminal 3a of motor phase winding 3 to intermediate voltage tap 9a is completed by a permanent solid conductor connection. The reduced voltage starting connections of the motor to the supply conductors L1, L2 and L3 are completed by the contactor 6. In the picked up position of this contactor, its contacts 6a, 6b and 6c complete connections from the second terminals 2b, 3b and 4b through conductors 16, 17 and 18 respectively to corresponding suply conductors L2, L3 and L1. The power connections of the motor phase windings to the supply conductors at the completion of this initial step of the starting operation are illustrated in FIG. 3. It is to be noted that during this initial step of the starting operation, the contacts 6a, 6b and 6c of contactor 6 are included in series relationship with motor phase windings 2, 3 and 4 respectively within the delta circuit configuration. In a delta connection, the current in each of the line conductors L1, L2 and L3 is 1.73 times the current in each of the motor phase windings. Since each of the contacts 6a, 6b and 6c carries only the current of the motor phase winding with which it is connected in series, it carries only .58 of the current in each line conductor.

After a predetermined interval of time, starting contactor 5 is deenergized and dropped out and after a further interval of time, run contactor 7 is energized and picked up. Any suitable time delay device may be provided to insert these time delays in the operating sequence. In the FIG. 1 embodiment these time delays are obtained by providing contactor 6 with auxiliary normally closed time opening contacts 6e and auxiliary normally open time closing contacts 6f together with a dashpot device 6g for retarding the opening movement of contact 6e and the closing movement of contact 6f.

Figure 4:
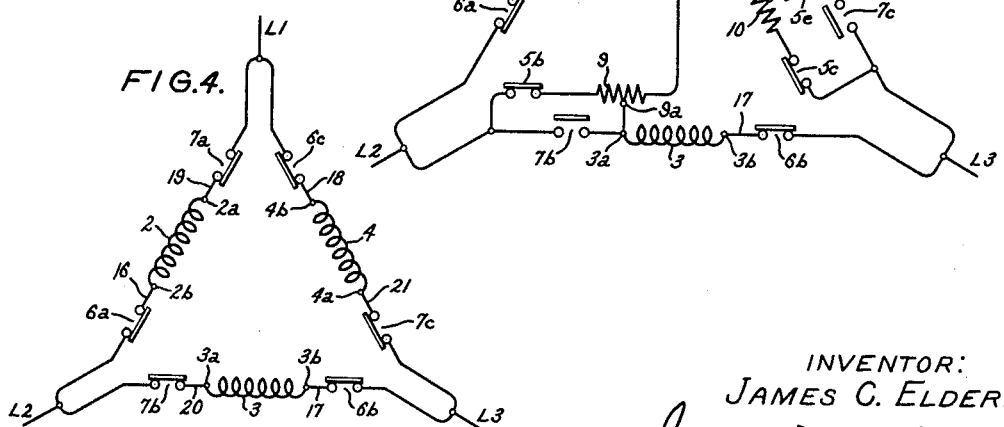

Contactor 5, in dropping out in response to opening of contacts 6e, opens its contacts 5a, 5b and 5c to disconnect the auto transformer phase windings 8, 9 and 10 from the supply line conductors and also opens contacts 5d and 5e to disconnect the motor phase windings from the reduced voltage taps on the transformer windings. At this instant the motor windings are disconnected from the supply. Contactor 7, in picking up in response to closure of contacts 6f, closes its main contacts 7a, 7b and 7c to complete the "run" connections from the motor phase terminals 2a, 3a and 4a through conductors 19, 20 and 21 respectively to corresponding supply line conductors L1, L2 and L3 respectively. In the run position, each motor phase winding is connected directly across a corresponding phase of the supply conductors L1, L2 and L3. The power circuit connections for the run position are illustrated in FIG. 4. As shown in FIGS. 1, 3 and 4 each of the conductor connections 16, 17 18, 19, 20 and 21 between the contactors 6 and 7 and the motor phase terminals is electrically isolated from all the others; that is to say there is no electrical connection between any one of these conductors and any other throughout their extent from the contactor contacts to the motor phase winding terminals. Consequently each of the main contacts of contactors 6 and 7 is in series with a corresponding motor phase winding 2, 3 or 4 respectively within the delta configuration and when closed carries only motor phase current and does not carry line current which is 1.73 times motor phase current. Thus, as shown in FIGS. 3 and 4, each of the main contacts 6a, 6b and 6c of contactor 6 and contacts 7a, 7b and 7c of contactor 7 is at all times during starting and running in series with a corresponding motor phase winding 2, 3 or 4 within the delta configuration; consequently, at all times when the motor is connected to the supply during starting and running, the current carried by contactors 6 and 7 does not exced motor phase current which is .58 times line current. Thus, the current rating of the starter may properly be 1.73 times the rating of these contactors.

Since the motor is momentarily disconnected from the supply line conductors between starting and running when the start contactor 5 is opened, the starter illustrated in the FIG. 1 embodiment is known as an open transition starter.

Figure 2:
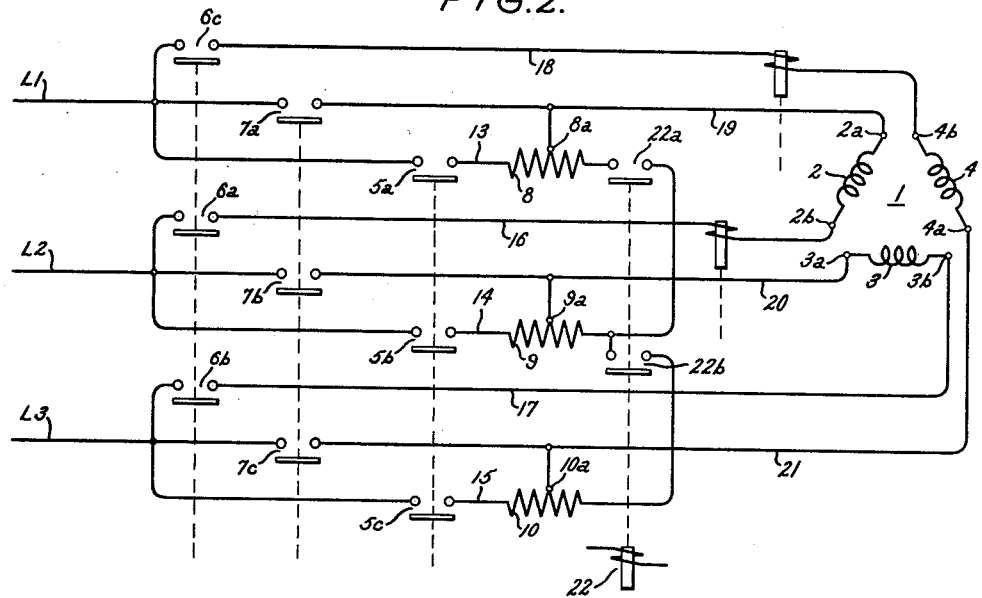
FIG. 2 is a simple schematic diagram of a modification of the FIG. 1 embodiment.

The power circuit connections of a closed transition starter that is otherwise generally similar to the open transition starter of FIG. 1 are illustrated in FIG. 2 in which corresponding parts have the same reference characters as in the FIG. 1 embodiment. In the FIG. 2 embodiment, the first motor phase terminals 2a, 3a and 4a are permanently connected by conductor connections to reduced voltage taps 8a, 9a and 10a of the auto transformer phase windings and the contacts 22a and 22b of a Y contactor 22 are included in the neutral connections of the transformer phase windings for the purpose of establishing and opening Y point connections. A control accessory generally similar to the control illustrated in FIG. 1 may be provided for controlling the closed transition embodiment of FIG. 2.

The operation is similar to the operation of the FIG. 1 embodiment. Contactor 5 in picking up, closes its main contacts 5a, 5b and 5c to connect the transformer phases 8, 9 and 10 to the supply line conductors L1, L2 and L3. Simultaneously, contactor 22 is picked up to close its contacts 22a and 22b to establish the Y point and contactor 6 closes its main contacts 6a, 6b and 6c to connect the second terminals 2b, 3b and 4b of motor phase windings 2, 3 and 4 to supply conductors L2 and L1 respectively.

At the end of a predetermined interval of time that is sufficient to permit the motor to accelerate, contactor 22 is deenergized and its contacts 22a and 22b are opened to open the Y point connections. The auto transformer phase windings now act as reactors in the connections between the supply conductors and the motor phase windings.

Contactor 7 is next energized and closed and contactor 5 is subsequently opened. Contactor 7 in its closed position short circuits the portions of the transformer windings acting as reactors and directly connects the motor phase terminals 2a, 3a and 4a to the supply conductors and the subsequent opening of contactor 5 disconnects the transformer from the supply conductors. This applies full voltage to the motor phase windings through contactors 6 and 7. As in the FIG. 1 embodiment, at all times during the starting transition and during the subsequent running connections the main contacts of contactors 6 and 7 are included in series relationship with corresponding motor phase windings within the delta configuration and thus at no time do they carry current in excess of motor phase current. Consequently the starter of the FIG. 2 embodiment may properly have a current rating 1.73 times the current rating of the contactors 6 and 7.

Alterations and modifications will readily suggest themselves to persons skilled in the art without departing from the true spirit of the invention or from the scope of the annexed claims.

What I claim as new and desire to secure by Letters Patent of the United States is:

1. A starter for a six lead delta wound motor having three terminally separated phase windings with all winding terminals separately brought out for external delta connection to three phase power supply conductors comprising: an auto transformer having three phase windings provided with intermediate reduced voltage taps, means for connecting a first terminal of each of said motor phase windings to the intermediate tap of a corresponding transformer phase winding, a starting switching device for connecting each of said transformer phase windings to a corresponding one of said three phase power supply conductors, a first switching device having contacts for establishing a separate electrical connection from the second terminal of each of said motor phase windings to a corresponding one of said supply conductors, and a second switching device for establishing a separate electrical connection from each of said first terminals of said motor phase winding to a corresponding one of said supply conductors, said connections being isolated from each other throughout their extent from said contacts to said first and second terminals so that the contacts of said first and second switching devices when closed are in series with the motor phases within the delta circuit configuration and carry motor phase currents during starting and running.

2. A starter for a six lead delta wound motor having three phase windings terminally separated from each other with all six winding terminals separately brought out for external delta connection to three phase power supply conductors comprising: an auto transformer provided with intermediate reduced voltage taps, means for connecting a first terminal of each of said motor phase windings to the intermediate tap of a corresponding transformer phase winding, a control device actuatable from a first operating condition to a second operating condition, a starting switching device having contacts between said transformer phase windings and corresponding ones of said supply conductors and responsive to actuation of said control device for completing connections therebetween, a first switching device having contacts between said second motor phase terminals and corresponding supply conductors for establishing connections therebetween in response to actuation of said control device and a second switching device having contacts between said first motor phase terminals and corresponding supply conductors for establishing connections therebetween in response to actuation of said control device, said connections between said motor phase terminals and said first and second switching devices being isolated from each other throughout their contact to terminal extent whereby the contacts of said first and second switching devices when closed are in series with the motor phases within the delta circuit configuration and carry motor phase currents during starting and running.

3. A starter for a six lead delta wound motor having three terminally separated phase windings wtih all six terminals brought out for external delta connection to three phase power supply conductors comprising: an autotransformer having three phase windings provided with intermediate reduced voltage taps, means for connecting a first terminal of each of said motor phase windings to the intermediate tap of a corresponding transformer phase winding, a master control device, a starting switching device connected to be responsive to operation of said master control device for connecting said transformer phase windings to said three phase power supply conductors, a first switching device connected to be responsive to said operation of said master control device for connecting the second terminal of each of said motor phase windings to a corresponding one of said supply conductors, a second switching device, and time delay means responsive to operation of said first switching device for causing said starting switching device to disconnect said autotransformer from said power supply conductors a predetermined interval of time after said operation of said master control device and for controlling said second switching device to connect a first terminal of each of said motor phase windings to a corresponding one of said supply line conductors a predetermined interval of time after said operation of said master control device and after said starting switching device disconnects said auto transformer from said conductors, the contacts of said first and second switching devices when closed being in series with the motor phases within the delta circuit configuration to carry motor phase currents during starting and running.

4. A starter for a six lead delta wound motor having three terminally separated phase windings with all six winding terminals separately brought out for external delta connection to three phase power supply conductors comprising: an auto transformer having three phase windings provided with intermediate reduced voltage taps, conductors connecting a first terminal of each of said motor phase windings to the intermediate tap of a corresponding transformer phase winding, a starting switching device for connecting each of said transformer phase windings to a corresponding one of said three phase power supply conductors, a contactor for establishing Y point connections of the transformer phase windings, a first switching device having contacts for establishing a separate electrical connection from the second terminal of each of said motor phase windings to a corresponding one of said supply conductors, and a second switching device for establishing a separate electrical connection from each of said first terminals of said motor phase windings to a corresponding one of said supply conductors, said connections being isolated from each other throughout their extent from said contacts to said first and second terminals so that the contacts of said first and second switching devices when closed are in series with the motor phases within the delta circuit configuration and carry motor phase currents during starting and running.

References Cited by the Examiner
UNITED STATES PATENTS

| | | | |
|---|---|---|---|
| 1,003,915 | 9/11 | Knight | 318—414 |
| 1,072,422 | 9/13 | Burke | 318—230 X |
| 1,084,698 | 1/14 | Hall | 318—230 |
| 1,519,255 | 12/24 | Harvey | 318—414 |

JOHN F. COUCH, *Primary Examiner.*

ORIS L. RADER, *Examiner.*